F. R. SCOFIELD.
MECHANISM FOR PRODUCING MERCHANTABLE BOLTS FROM BOLT BLANKS.
APPLICATION FILED DEC. 6, 1915.

1,184,033.

Patented May 23, 1916.
5 SHEETS—SHEET 1.

F. R. SCOFIELD.
MECHANISM FOR PRODUCING MERCHANTABLE BOLTS FROM BOLT BLANKS.
APPLICATION FILED DEC. 6, 1915.

1,184,033.

Patented May 23, 1916.
5 SHEETS—SHEET 2.

Inventor
Frank R. Scofield
by Thurston & Kwis
Attorney

F. R. SCOFIELD.
MECHANISM FOR PRODUCING MERCHANTABLE BOLTS FROM BOLT BLANKS.
APPLICATION FILED DEC. 6, 1915.
1,184,033.
Patented May 23, 1916.
5 SHEETS—SHEET 4.
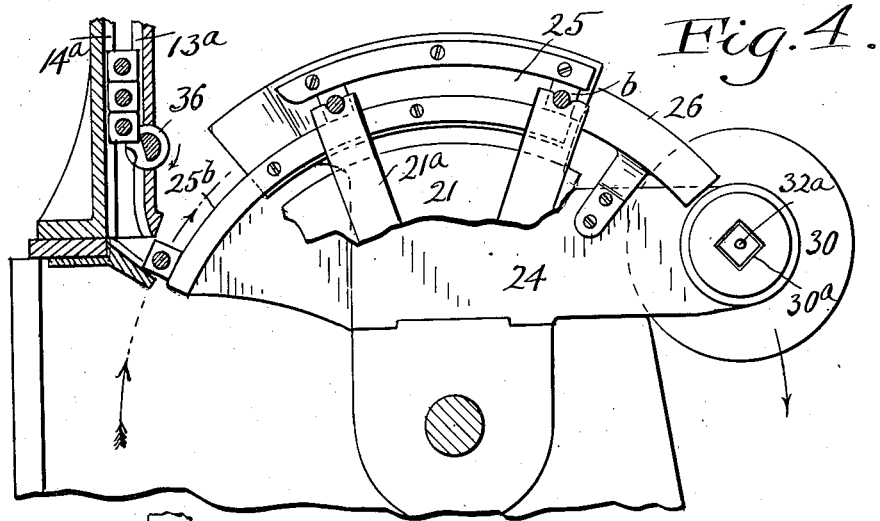
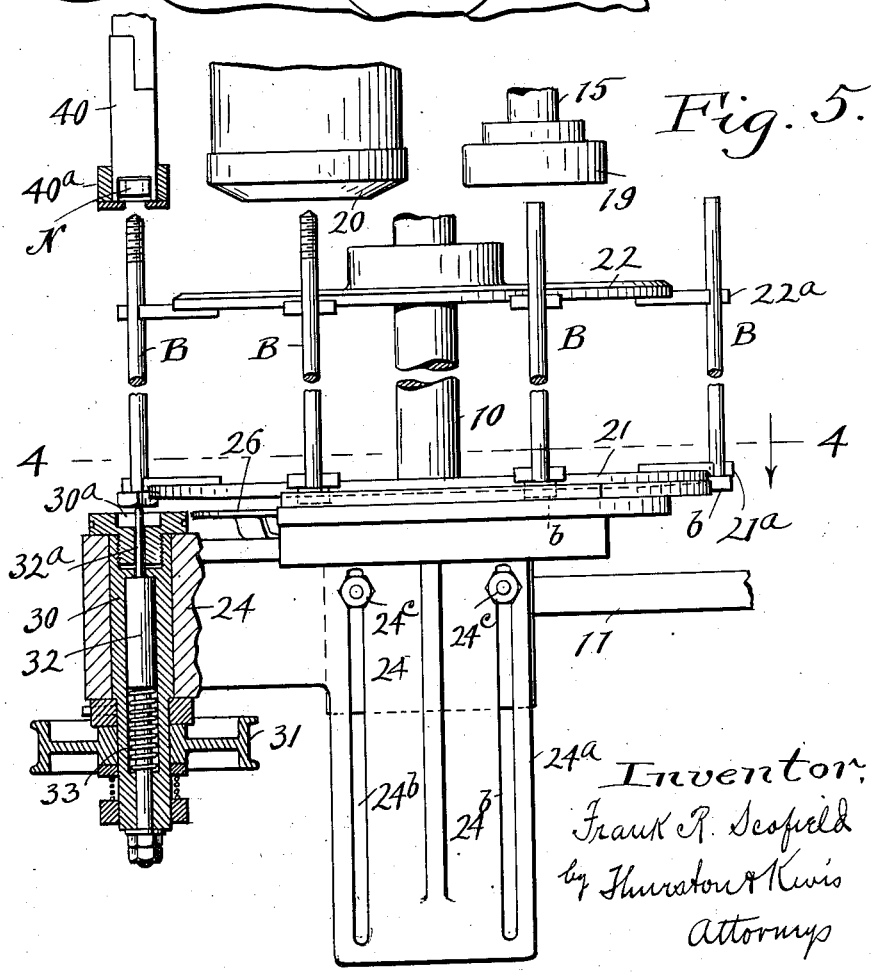

F. R. SCOFIELD.
MECHANISM FOR PRODUCING MERCHANTABLE BOLTS FROM BOLT BLANKS.
APPLICATION FILED DEC. 6, 1915.
1,184,033.
Patented May 23, 1916.
5 SHEETS—SHEET 5.
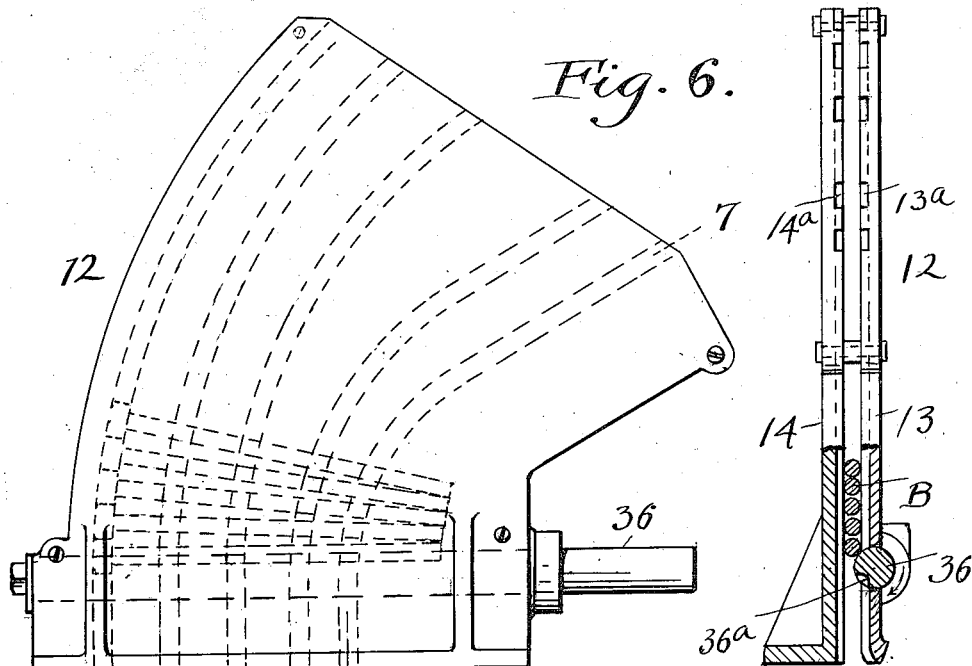
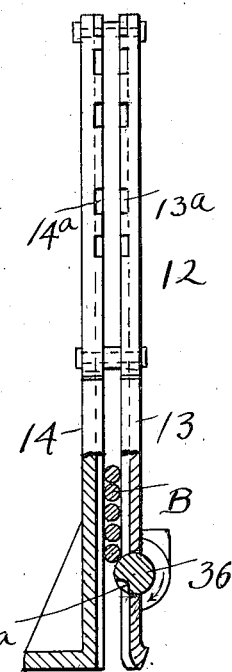
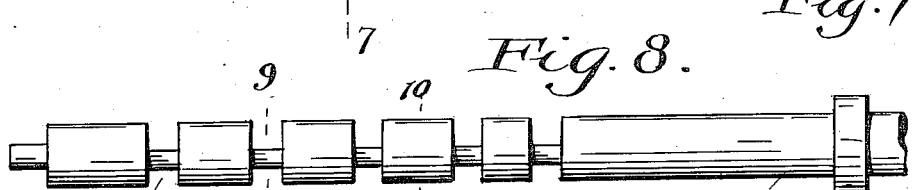
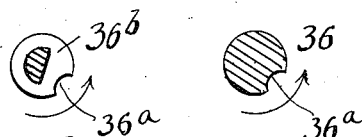
Inventor,
Frank R. Scofield
by Thurston & Kwis
Attorneys

UNITED STATES PATENT OFFICE.

FRANK R. SCOFIELD, OF CLEVELAND, OHIO.

MECHANISM FOR PRODUCING MERCHANTABLE BOLTS FROM BOLT-BLANKS.

1,184,033.　　　　Specification of Letters Patent.　　Patented May 23, 1916.

Application filed December 6, 1915. Serial No. 65,168.

*To all whom it may concern:*

Be it known that I, FRANK R. SCOFIELD, a citizen of the United States, residing at Cleveland, in the county of Cuyahoga and State of Ohio, have invented a certain new and useful Improvement in Mechanism for Producing Merchantable Bolts from Bolt-Blanks, of which the following is a full, clear, and exact description.

The object of this invention is to cheapen the production of mechantable bolts, that is to say, bolts upon each one of which an associated nut is screwed.

The invention is a machine into which bolt blanks are placed, and from which these blanks, transformed into threaded and pointed bolts, and having nuts screwed onto them, are discharged. The machine is so organized that automatically the bolts are released one by one from a bolt chute into the embrace of a bolt carrier by which they are successively presented to the action of a bolt pointing tool, a bolt threading tool, and bolt nutting instrumentalities, in such wise that after the machine is in operation the bolt pointing, bolt threading and nutting mechanisms are simultaneously working on three different bolt blanks.

The machine is shown in the accompanying drawings, and is hereinafter described, and the particular novel combinations of parts which the machine contains are definitely recited in the appended claims.

Figure 1:
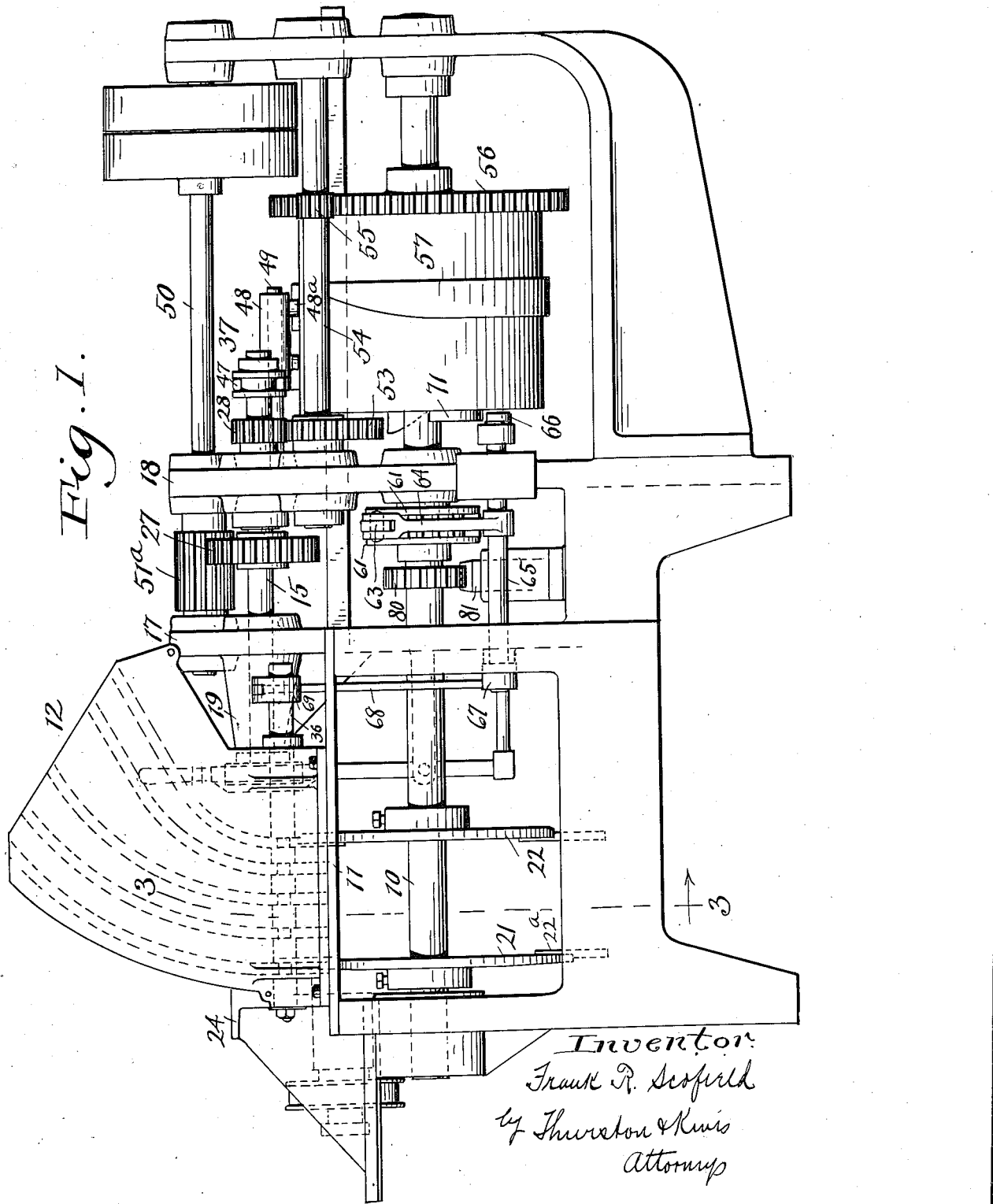
Figure 2:
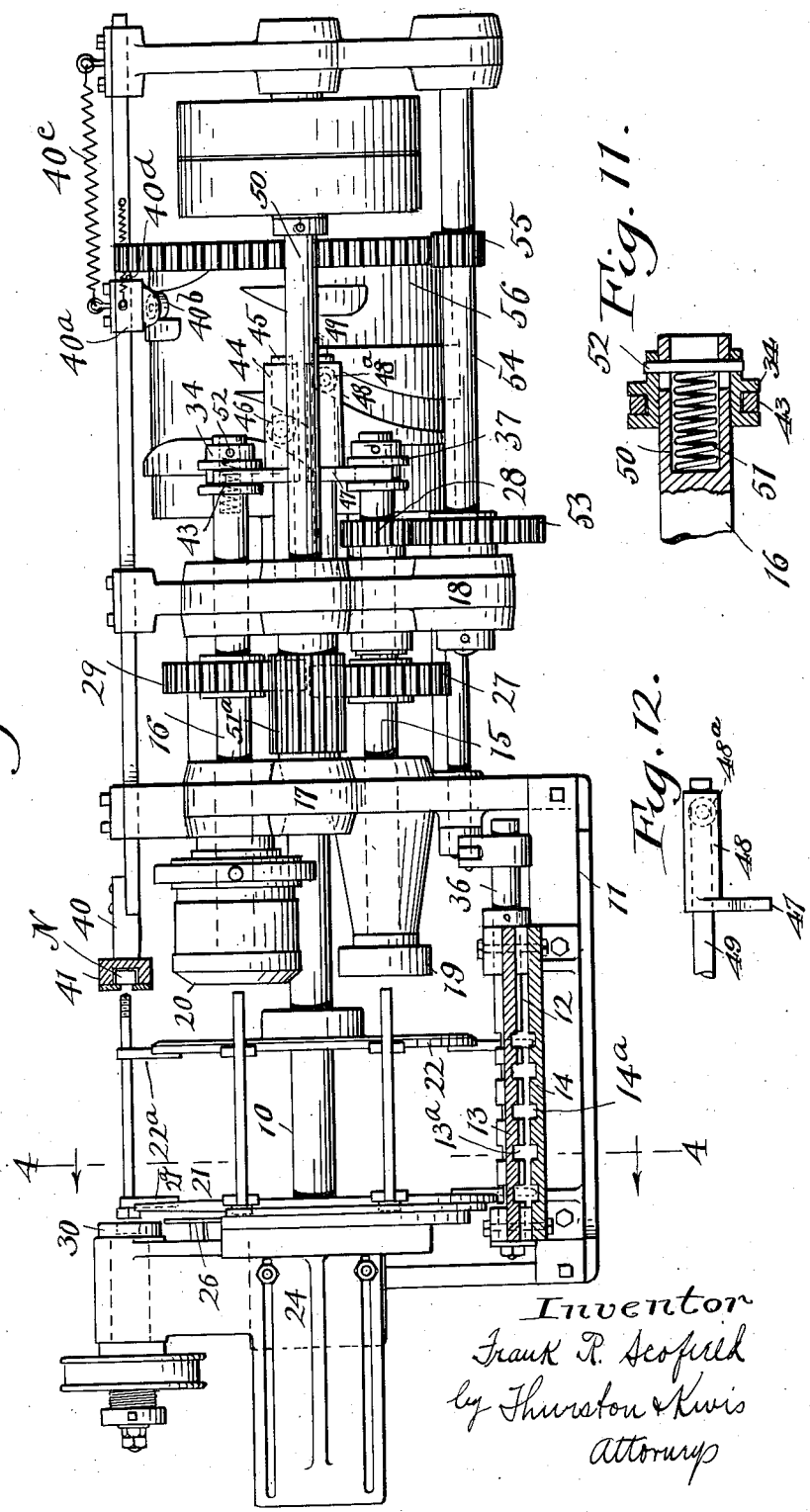
Figure 3:
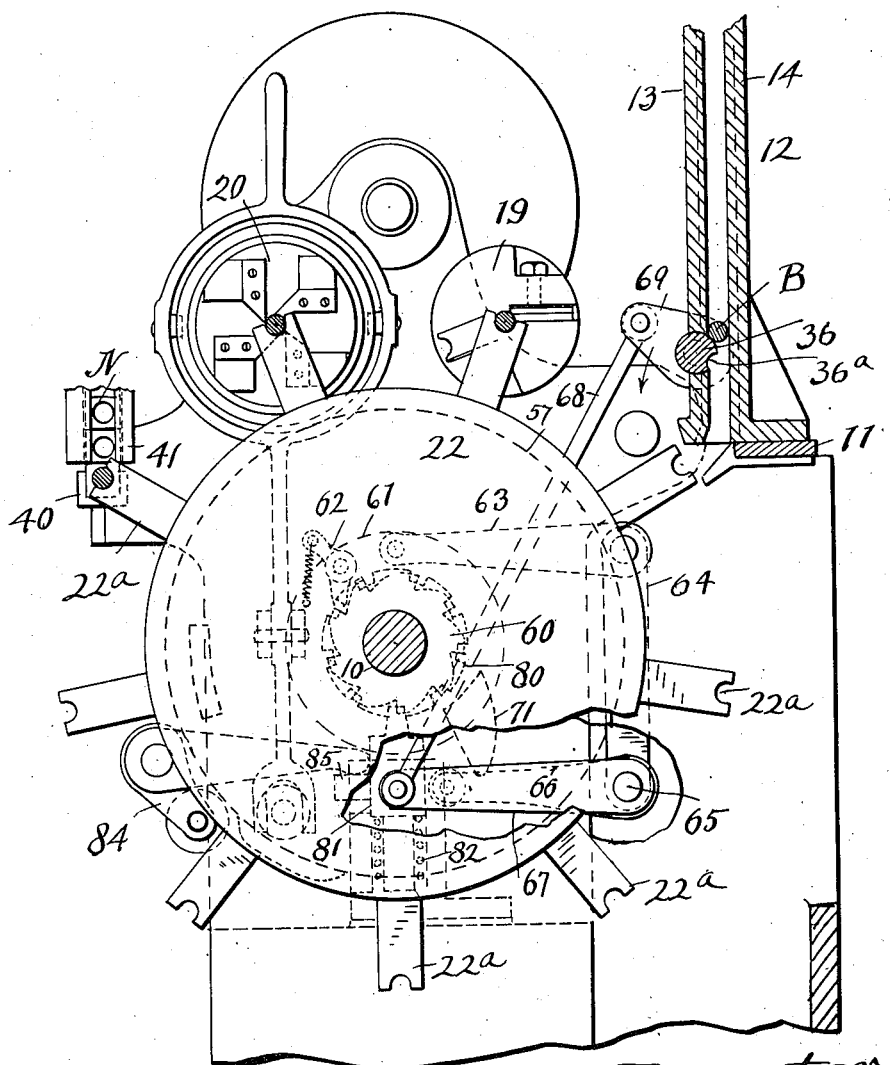

In the drawings, Figure 1 is a side elevation of a machine embodying the invention; Fig. 2 is a plan view of said machine when the bolt chute and the nut chute are sectioned as shown. Fig. 3 is a sectional end view in the plane indicated by line 3—3 on Fig. 1. Fig. 4 is a sectional view of certain parts of the machine in the plane indicated by line 4—4 on Fig. 2; Fig. 5 is a plan view partly sectioned of some mechanism at the left end of the machine, as shown in Figs. 1 and 2. Fig. 6 is a side view of the bolt chute; Fig. 7 is a vertical transverse sectional view thereof in the plane of line 7—7 on Fig. 6; Fig. 8 is a detached view of the shaft which forms a part of the escapement mechanism of said bolt crute; and Figs. 9 and 10 are respectively transverse sectional views of this shaft on the planes indicated by lines 9 and 10 on Fig. 8. Fig. 11 is a vertical sectional view of the rear end of the shaft 16 and parts carried thereby; Fig. 12 is a plan view of the rear end of the guide bar 49 and the parts mounted theron.

In the machine is a rotatable shaft 10 to which a bolt carrier is secured, which carrier will be presently explained. It is sufficient for the present to say that bolt blanks B are automatically delivered one by one from a bolt chute 12 into the embrace of said carrier; and that said carrier conveys them and presents them successively to a bolt pointing tool 19, a bolt threading tool 20, and to the nutting mechanism which will be presently explained. Parallel with this shaft 10 are two shafts 15 and 16. These are mounted in bearings in the frame members 17 and 18 in such wise that they may turn and move endwise, and they are placed in such positions that their axes are equal distances from the axes of the shaft 10.

The bolt pointing tool 19 is fixed to that end of the shaft 15 which is adjacent to the bolt carrier; and this pointing tool may be of any suitable construction,—of which there are many well known to be adapted for the purpose. Fixed to the corresponding end of the shaft 16 is the bolt threading tool 20 which likewise may be of any familiar or well known construction, of which many suitable for the purpose are known. The bolt blanks B in the embrace of the carrier are held in such position that the axes of said bolt blanks are parallel with the axes of the shafts 10, 15 and 16, and in such wise that the ends of the bolt shanks will be carried into alinement with the pointing and threading tools.

There is a socket wrench 30 rotatably mounted in suitable bearings, and in such position that the heads of the bolts will be presented to it. This wrench will be explained more in detail later, and for the present it will be sufficient to say that its axis is parallel with the axis of the shaft 10.

The bolt blanks B are put into a bolt chute 12, which is a vertical recess between two parallel plates 13 and 14, that are fixed to the front side of the machine frame 11. In the opposed faces of these plates are the grooves 13ª and 14ª which grooves together form guideways in which the heads 6 of said bolts will move. If the machine were organized to operate on bolt blanks of uniform length, only one pair of the grooves 13ª, 14ª, would be necessary. As shown, however, there are several pairs of said grooves in the plates 13, 14, and whether the heads of the bolt blanks in the bolt chute are caused to move in one or another pair of these grooves depends upon the length of the bolt blanks.

The lowest bolt in the bolt chute will occupy a substantially horizontal position with its axis parallel with the axis of the shaft 10. The other bolts in the chute will be piled up on one another so that they will occupy substantially the position indicated in Fig. 6. This pile of bolts is prevented from dropping out of the lower end of the bolt chute by means of escapement mechanism which in the particular form shown includes a rock shaft 36. The construction of this rock shaft will appear clearly from Figs. 8 and 9. A crescent-shaped longitudinal groove $36^a$ is formed in said shaft; and other deeper grooves $36^b$ are cut in said shaft adjacent the several grooves $13^a$ and $14^a$ of the bolt chute. Normally this rock shaft lies in the position such as shown in Fig. 7, where it extends partly across the lower end of the bolt chute so as to intercept and support the lowest bolt in said chute. When, however, this rock shaft is rocked through an arc of approximately 90° in the direction of the arrow shown in Fig. 7, the lowermost bolt blank will drop, the shank thereof entering the crescent-shaped recess $36^a$ and the head entering the deeper recess $36^b$. When now the rock shaft is rocked in the reverse direction back to its normal position this bolt will be carried down, and released and allowed to drop from the lower end of the bolt chute and enter the embrace of the bolt carrier. This bolt carrier consists of two disks 21, 22, which are fixed to the shaft 10 in suitable positions relative to the threading and pointing tools and to each other by means of set screws 23. The adjustability of these disks and particularly of the disk 21 which is farthest from the bolt pointing and threading tools, is to enable the machine to operate on bolts of different lengths. These disks have respectively fixed to them a plurality of radially extending and equally spaced arms $21^a$, $22^a$; and all of these arms have in their outer ends the approximately semi-circular bolt sockets $21^b$, $22^b$. These arms are fixed to the disks in such position that when a bolt rests in a pair of sockets $21^b$, $22^b$, this bolt will be parallel with the shaft 10.

At the left end of the machine is an adjustable carriage 24. It is supported on the frame work 11 of the machine and is movable horizontally toward and from the bolt pointing and threading tools. The wrench 30 before referred to, is rotatably mounted in bearings upon this carriage. The front of the carriage $24^a$ has a plurality of long slots $24^b$ through which pass the bolts $24^c$ by which the carriage is fixed to the frame of the machine when it has once been adjusted into the desired position. On the left face of this carriage is an arc-shaped groove 25 which is of such width and is placed in such position that the heads $b$ of the bolts B which are in the embrace of the bolt carrier will enter and move in it. The fact that the heads of the bolts are in this slot prevents bolts from turning upon their own axes while they are being pointed and threaded. What may be called the back wall $25^a$ of this recess prevents the bolts from moving endwise as they are being threaded or pointed. The lower arc shaped wall $25^b$ of this groove extends to a position such that when a bolt is dropped from the bolt chute it not only enters the sockets in the arms $21^a$, $22^a$, but likewise the head engages with the curved surface of this wall. There is likewise a plate 26 which is a practical continuation of the back wall of the groove 25, and this extends up to the rotatable wrench 30.

The wrench 30 as stated is mounted in bearings upon the sliding carriage 24. A pulley 31 is fixed to it so that it may be rotated by a belt engaging the said pulley. This wrench shaft, however, is tubular and contains a spring-actuated ejector plunger 32, the reduced end $32^a$ of which projects centrally out of the socket $30^a$ in the end of said wrench; and the spring 33 acts to yieldingly hold the plunger in this position. This wrench is located in a position such that when the bolt carrier stops in one of its appointed stopping places, a bolt which is supported by said carrier will have its head in alinement with the socket $30^a$ of this wrench. The threaded and pointed opposite ends of this bolt will at the same time be alined with the threaded hole of a nut N which is in recess $40^a$ in the top surface of a slide 40. This slide lies directly beneath a nut chute 41 of familiar form, which is designed to contain a stack of nuts piled one upon another, the lowest nut resting upon the slide. When the slide is in its retracted position, the recess $40^a$ will be directly below this stack of nuts, so that the lowest nut will fall into it. When the slide is moved toward an adjacent bolt B it will carry the nut with it, and the hole in the nut will take over the end of the bolt, and by pressing against the bolt it will push the bolt endwise, and cause its head to enter the socket $30^a$ in the wrench, which, since it is in constant rotation, will turn the bolt and screw it into the said nut. When the slide is again retracted the spring plunger 32 will push the head of the bolt out of the socket $30^a$, wherefore, when the bolt carrier makes its next advance, this finished bolt with the nut on it will be dropped from the carrier.

A gear 27 fixed to the shaft 15 and a gear 29 fixed to shaft 16, are in mesh with a long gear $51^a$ on the main driving shaft 50 of the machine. A gear 28, which has a tongue and groove driving connection with the shaft 15, meshes with a gear 53 on a counter shaft 54 which carries a pinion 55 which meshes with a gear 56 on a cam drum 57. This drum is rotatably mounted upon the shaft 10, and it carries a plurality of cams whose function is to impart to various parts which have heretofore been mentioned their charactertistic movements. On the shaft 16 is a circumferentially grooved collar 34. A forked arm 43 engages in the groove in this collar 34, and this forked arm is fixed to a slide 44, which is mounted upon a fixed bar 45; and this slide carries a friction roller 46 which is extended into position such that cams on the cam drum may engage it and move the slide 44, and consequently move collar 34 and the shaft 16. A similar collar 37 is mounted on the shaft 15 and it is engaged by an arm 47 fixed to a slide 48 mounted on a fixed guide bar 49, and this slide is likewise provided with a friction roller 48$^a$ which extends to position such that cams on the cam drum may engage it and thereby cause the movement of slide 48 and shaft 15.

Both collars 34 and 37 have yielding connections with their respective shafts 16 and 15. In each shaft is a recess 50 in which is a coiled spring 51. A pin 52 fixed to the collar goes through a slot in the shaft and engages with said spring. Therefore when either collar is moved to the left toward the bolt, this movement is transmitted to the associated shaft through the spring. Therefore the pointing and threading tools are in effect spring-pressed against the work, that is, the bolts on which they operate.

The nut feeding slide 40 likewise has a collar 40$^c$ on it which carries a friction roller 40$^b$ extended to position such that cams on the cam drum may engage it. This collar is associated with a spring 40$^e$ which is connected at its ends with the collar and slide and acts to move the collar on the slide up against a stop pin 40$^d$ carried by the slide. A spring 41$^a$ is also connected with this collar and with a fixed part of the machine frame, and this acts to retract the slide. In other words, the cam on the cam drum will move the collar toward the bolt carrier and this collar acting through the spring will yieldingly move the slide in the direction to carry the nut into engagement with the adjacent bolt, and then move the bolt head into the socket of the wrench 30.

The bolt carrier as above described is moved intermittently step by step through arcual distances corresponding with the distances between the axes of the bolt pointing and bolt threading tools, which distance likewise corresponds with the distance between the bolt threading tool and the discharge end of the bolt chute, and between the nut threading tool and the axis of the wrench. This movement is produced by means of a ratchet 60 secured to the shaft 10, and associated mechanism as follows: A disk 61 is rotatably mounted upon the shaft adjacent this ratchet, and it carries a spring pawl 62 for engagement with the ratchet. A link 63 connects this disk with the vertical arm 64 which is attached to a rock shaft 65; and this rock shaft has a horizontal arm 66 adapted to be engaged by a cam 71 carried by the cam drum 57. During each revolution of the cam drum, therefore, this mechanism is operated with the result of turning shaft 10, and consequently the bolt carrier thereon through one of its arcual movement steps as above described.

Fixed to the same rock shaft 65 is another arm 67 which is connected by a link 68 with an arm 69 fixed to the escapement rock shaft 36, wherefore this escapement will be operated. It will also appear that this escapement rock shaft will be rocked to the position to allow the bolt to drop into the grooves therein, while the bolt carrier is being moved. When the bolt carrier stops, the parts which moved it return to their normal position, and so also will the escapement rock shaft. When it does return to its normal position the bolt in its embrace will be dropped as stated.

The various cams on the cam drum do not seem to need any special description beyond this, viz: They are so constructed that as soon as the bolt carrier comes to rest, these cams will cause shaft 15 or 16 to move endwise, thereby causing the pointing and threading tools to engage and operate upon alined bolts, and causing the nut slide to move in the direction such as to cause a nut to be applied to a bolt;—and then these parts will be restored to their normal positions.

The bolt carrier, or rather its shaft 10, is temporarily locked when it comes to the position in which it presents the bolts thereon to the action of the pointing tool, etc. Fixed to the shaft 10 is a ratchet 80. Associated with this is a vertical plunger 81 which is under the influence of a spring 82 tending to move it up into engagement with the ratchet. A bell crank lever 84 has one arm which engages a shoulder 85 carried by the plunger and another arm which is engaged by a cam on the cam drum, whereby this bell crank lever will be rocked at the proper moment to release the plunger from the ratchet and to allow the plunger to go into engagement with the ratchet.

Having described my invention, I claim:
1. In a machine for producing merchantable bolts from bolt blanks, the combination of a rotatable bolt carrier adapted to hold a plurality of bolts in positions parallel with and equidistant from the axis of the carrier and at equal distances from one another, means for intermittently moving said bolt carrier arcual distances equal to the arcual distances between the bolts thereon, a rotatable bolt threading tool, and a rotatable bolt pointing tool, each of which is mounted to move in the direction of its axis and in such positions that the axis of said tools are alined with two bolts on the bolt carrier when the bolt carrier is at rest, a rotatable socket wrench containing a spring actuated bolt ejector plunger,—which socket wrench is located in such position that its axis is alined with a third bolt on the carrier when the carrier is at rest, a nut chute, a slide movable beneath said chute in a direction parallel with the socket wrench and containing a recess into which the lowest nut in said chute will drop when the slide is retracted, said slide being so located that the axis of a nut in said recess will be alined with the axis of said socket wrench, means for delivering bolt blanks one by one into the embrace of said bolt carrier, a plate containing an arc shaped groove located to receive the heads of bolts which are supported upon said bolt carrier, means for yieldingly moving said bolt pointing tool, and bolt threading tool, and nut slide toward the bolt carrier.

2. In a machine for producing merchantable bolts from bolt blanks, the combination of a rotatable bolt threading tool, a rotatable bolt pointing tool, each of which is mounted to move in the direction of its axis, a socket wrench, and a nut slide opposed thereto and adapted to hold a nut in such position that the axis thereof is alined with the axis of said socket wrench, and a bolt carrier adapted to hold a plurality of bolts and to present them successively to the action of the bolt pointing tool, the bolt threading tool, and the socket wrench, said bolt carrier comprising a shaft and two disks fixed thereto, each of said disks carrying a plurality of equally spaced radial arms having bolt holding recesses in their outer ends, means for automatically delivering bolt blanks into the recesses of said radial arms, means for automatically feeding nuts into the recess in said slide, means for turning said carrier step by step to bring the bolts thereon successively into alinement with the pointing, threading, and nutting instrumentalities, and means for yieldingly moving said pointing and threading tools toward and into engagement with bolts on said carrier, and for yieldingly moving said nut holding slide toward the socket wrench.

3. In a machine for producing merchantable bolts from bolt blanks, the combination of a rotatable bolt threading tool, a rotatable bolt pointing tool each of which is mounted to move in the direction of its axis, a socket wrench, and a nut slide opposed thereto and adapted to hold a nut in such position that the axis thereof is alined with the axis of said socket wrench, and a bolt carrier adapted to hold a plurality of bolts and to present them successively to the action of the bolt pointing tool, the bolt threading tool, and the socket wrench said bolt carrier comprising a shaft and two disks fixed thereto, each of said disks carrying a plurality of equally spaced radial arms having bolt holding recesses in their outer ends, a bolt chute comprising two separated plates in the opposed faces of which is a bolt head channel, an escapement mechanism for said bolt chute comprising a rock shaft having a peripheral groove adapted to receive a part of a bolt shank, and a deeper groove adapted to receive the head of a bolt, and means for rocking said rock shaft periodically from and back to its normal position.

4. In a machine for producing merchantable bolts from bolt blanks, the combination of a rotatable bolt threading tool, a rotatable bolt pointing tool each of which is mounted to move in the direction of its axis, a socket wrench, and a nut slide opposed thereto and adapted to hold a nut in such position that the axis thereof is alined with the axis of said socket wrench, and a bolt carrier adapted to hold a plurality of bolts and to present them successively to the action of the bolt pointing tool, the bolt threading tool, and the socket wrench, said bolt carrier comprising a shaft, two disks fixed thereto, means for adjusting one of said disks lengthwise of the shaft,—each of said disks carrying a plurality of equally spaced radial arms having bolt holding recesses in their outer ends, a bolt chute comprising a plurality of separated plates in the opposed faces of which are a plurality of bolt head channels, means for releasing bolts one by one from said chute, a carriage adjustable toward and from the bolt threading and pointing tools and having in its face opposed to them an arc-shaped groove for the reception of the heads of bolts supported on said bolt carrier.

In testimony whereof, I hereunto affix my signature in the presence of two witnesses.

FRANK R. SCOFIELD.

Witnesses:
E. L. THURSTON,
A. J. HUDSON.